United States Patent [19]

Huhn et al.

[11] Patent Number: 4,888,195
[45] Date of Patent: Dec. 19, 1989

[54] ETHER BRIDGED POLYESTERS AND FOOD COMPOSITIONS CONTAINING ETHER BRIDGED POLYESTERS

[75] Inventors: Stephen D. Huhn, Randolph; Peter S. Given, Jr., Verona; Lawrence P. Klemann, Somerville, all of N.J.

[73] Assignee: Nabisco Brands, Inc., East Hanover, N.J.

[21] Appl. No.: 224,409

[22] Filed: Jul. 26, 1988

[51] Int. Cl.$^4$ .................. A23D 1/00; C07C 69/704
[52] U.S. Cl. ......................... 426/601; 426/611; 426/612; 426/804; 560/180
[58] Field of Search ............. 426/601, 611, 612; 560/180

[56] References Cited

U.S. PATENT DOCUMENTS

| | | | |
|---|---|---|---|
| 3,227,559 | 1/1966 | Radlove | 426/612 |
| 3,239,555 | 3/1966 | Miksch | 560/180 |
| 3,278,593 | 10/1966 | Touey | 560/180 |
| 4,508,746 | 4/1985 | Hamm | 426/601 |
| 4,582,715 | 4/1986 | Volpehhein | 426/601 |

FOREIGN PATENT DOCUMENTS 959412  6/1964  United Kingdom ............... 560/180

Primary Examiner—Donald E. Czaja
Assistant Examiner—Evan Federman
Attorney, Agent, or Firm—Richard Kornutik

[57] ABSTRACT

Novel ether bridged polyester compositions are disclosed. Two multibasic acids, e.g., citric acid and isomers thereof, are joined by an ether-like linkage. (The citric acid molecule provides an hydroxyl which may be used in the ether linkage.) The carboxyls of the multibasic acid moieties of the new compounds may then have long chain fatty alcohols esterified thereto to provide the subject ether bridged polyesters. The superficial appearance of the polyester portions of the novel compounds is that of a triglyceride; however, upon close examination of the ester linkage, it is apparent that the novel compounds are reverse esters when compared to true triglycerides. It has been determined that a minimum of three reverse ester alkyl chains must be present on the molecule in order to consider it as a fat mimetic. The utility of the disclosed compositions is as a low to non-caloric fat substitute in food products. Additionally, the ether bridged polyesters may be used as lubricants for machinery.

25 Claims, No Drawings

ETHER BRIDGED POLYESTERS AND FOOD COMPOSITIONS CONTAINING ETHER BRIDGED POLYESTERS

BACKGROUND OF THE INVENTION

1. Technical Field

This invention relates to a non-caloric fatty substitute to be used in the production of low calorie foods. More in particular, this invention relates to a novel composition comprising two multibasic acids, e.g. citric acid, connected by an ether linkage. Esterified to the carboxyl groups of the multibasic acid moieties are alcohols. The compositions are thus deemed ether bridged polyesters.

2. Background Information

Low calorie food products have become more popular with the public becoming more aware of the role which nutrition plays in weight maintenance. This is in part due to the fact that a lot of people have a sedentary lifestyle with little or no opportunity to exercise. This increasing awareness has been accompanied by a proliferation of diet schemes which enable the dieter to alter the types of food ingested rather than reduce the amount ingested. The production of low calorie food products has increased to provide such diet schemes with reasonable low calorie food products which are pleasing to the taste and therefore more apt to keep the dieter on a diet.

Recently, research in lipid metabolism and cancer has implicated certain saturated lipids as possible carcinogens. The literature recommends the lowering of fats within the diet as a possible prophylaxis against cancer. Accordingly, the food industry has responded to the demand for lower fat foods by providing fat substitutes which physically act as fats in the production of food products yet are not metabolized as readily as typical fats or are not metabolized at all. In accordance with the need for low calorie food products, such low fat substitutes are preferably low in caloric content.

U.S. Pat. No. 4,508,746 to Hamm discloses low calorie edible oil substitutes. Typically, a fat consists of a glycerol molecule having esterified thereto three fatty acids. Hamm discloses a reverse structure wherein a tri-carboxylic acid has esterified thereto long chain alcohols. The low calorie material is said to resist enzyme hydrolysis within the gut and that it is believed the composition cannot be assimilated in the human digestive tract. Citric acid is specifically taught away from in column 5, lines 39–44, because it is known to be unsuitable for most usages unless the free hydroxyl group of the citric acid moiety is protected by a suitable blocking group. It is respectfully submitted that those ordinarily skilled in the art consider blocking groups to be such materials as methyl, ethyl, phenyl or amino radicals. Another citric acid molecule is not suggested nor implied as being a possible "blocking group".

U.S. Pat. No. 4,247,568 to Carrington et al. discloses a low calorie food additive produced by heating starch with a tri-basic carboxylic acid, for example, citric acid, to produce a nondigestible product. The products are said to be useful for replacing wholly or in part the carbohydrates and/or fat content of foods thereby providing dietetic foods of low calorie content.

U.S. Pat. No. 3,600,186 to Mattson et al. discloses an example of a low calorie fat material which is less digestible than ordinary fats. The fat material is structurally a sugar fatty acid ester or sugar alcohol fatty acid wherein the sugar sorbitol is reacted with a fatty acid such as oleic acid to yield a sorbitol octaoleate. Other sugars, for example sucrose, are also reacted with fatty acids to yield sucrose polyesters.

U.S. Pat. No. 3,579,548 to Whyte et al. discloses a less digestible triglyceride fat. The material consists of a glycerol ester wherein alpha-branched carboxylic acids are esterified to the glycerol moiety.

U.S. Pat. No. 2,485,639 to Vahlteich et al. discloses incorporating tri-alkyl citrates into a glyceridic oil. The material is said to provide a shortening for improved baked goods.

U.S. Pat. No. 3,227,559 to Radlov discloses reacting citric acid with fatty acid glyceride to produce additives for baked products. The fatty acid glyceride utilized are the mono and diglyceride.

"Food Emulsifiers: Surface Activity, Edibility, Manufacture, Composition and Application", Lauridsen, *J. AM OIL CHEMISTS' SOC.*, Vol. 53, 400–407, June 1976, contains a discussion concerning food emulsifiers, for example, citric acid ester of glycerol monostearate. The material is said to be used as an emulsifier for sausages and as an anti-spattering agent for margarine.

U.S. Pat. No. 3,042,530 to Kidger discloses shortening emulsifier and method for preparing the same. A reaction product is said to be derived by reacting citric acid, propylene glycol and mono-glyceride. The product is said to be useful as a shortening agent.

Citric acid is a versatile chemical, finding utility in many fields. Thus, many derivatives are known. For example, U. S. Pat. No. 3,239,555 to Miksch et al. discloses bis-citric acid ester. The free hydroxyl groups of two molecules of citric acid are esterified by a di-carboxylic acid. The esters are used as plasticizer.

Another example of a citric acid derivative is disclosed in U.S. Pat. No. 3,278,593 to Touey et al. Polyoxyalkylene ethers of citric acid are disclosed as metal deactivators.

There is a need in the art for new non-caloric and essentially non-digestible fat substitutes which can function as typical fats yet not be assimilated within the gut.

Accordingly, it is an object of the invention to provide a non-caloric, non-digestible fat substitute for use in low caloric and low digestible food products.

It is another object of the invention to provide a new fat substitute made from multibasic acids, wherein two multibasic acid molecules are joined by an ether or a multi-ether linkage, and wherein long chain alcohols are esterified to the citric acid carboxyls.

It is another object of the invention to provide a new fat substitute having increased hydrophobicity.

It is still another object of the invention to provide an ether fat substitute having greater stability against metabolism than the presently known ester linkages.

It is another object of the invention to provide a fat substitute having similarity to triglycerides in such characteristics as space filling models.

It is another object of the invention to provide a novel lubricant capable of lubricating machinery which handles food and machinery used to machine metals.

These and other further objects and features of the invention are apparent in the foregoing and ongoing specification which includes the claims.

SUMMARY OF THE INVENTION

The invention is a new composition of matter. The new composition is a fatty substance having mono or multibasic acid molecules joined by an ether bridge. Esterified to the free carboxyl groups of the molecules are straight chain or branched chain alcohols. Preferably, the alcohols have from about 1 to about 24 carbon atoms and are saturated, unsaturated or polyunsaturated.

The generic formula for the novel composition of matter is:

$$P-Q-P \quad (I)$$

The P symbols represent the polyesters and the Q symbol represents the ether bridge. The symbol P can be further symbolized as follows:

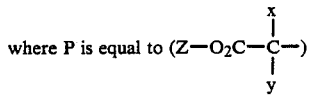

$$\text{where P is equal to } (Z-O_2C-\underset{\underset{y}{|}}{\overset{\overset{x}{|}}{C}}-) \quad (II)$$

When formula II replaces the P symbols in formula I there is provided the formula:

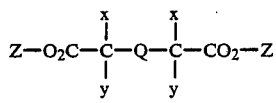

$$Z-O_2C-\underset{\underset{y}{|}}{\overset{\overset{x}{|}}{C}}-Q-\underset{\underset{y}{|}}{\overset{\overset{x}{|}}{C}}-CO_2-Z \quad (III)$$

In formulas I, II and III: the symbols of x and y equals: H, $(^{31}CH_2)_n-CO_2-Z$ except that at least one x or y is not H; Z equals a branched or un-branched alkyl chain having two (2) to twenty-six (26) carbon atoms, wherein the alkyl chain may be saturated or unsaturated; n equals 0, 1 or 2; and Q is equal to 0 or

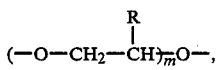

$$(-O-CH_2-\underset{\underset{}{|}}{\overset{\overset{R}{|}}{CH}}\overline{)_m}O-,$$

wherein m is equal to an integer between one (1) and twenty (20) and preferably between about one (1) and ten (10).

An example of a composition according to the inventive formulas I, II and III, wherein the multibasic acid, citric acid, is used is:

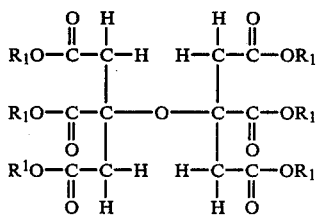

$$\begin{array}{cc}
R_1O-\overset{O}{\underset{\|}{C}}-\overset{H}{\underset{|}{C}}-H & H-\overset{H}{\underset{|}{C}}-\overset{O}{\underset{\|}{C}}-OR_1 \\
R_1O-\overset{}{\underset{\|}{C}}-\overset{}{\underset{|}{C}}-O-\overset{}{\underset{|}{C}}-\overset{}{\underset{\|}{C}}-OR_1 \\
O & O \\
R^1O-\overset{}{\underset{\|}{C}}-\overset{H}{\underset{|}{C}}-H & H-\overset{H}{\underset{|}{C}}-\overset{}{\underset{\|}{C}}-OR_1 \\
O & O
\end{array} \quad (IV)$$

wherein at least one $R_1$ comprises a straight or branched chain alcohol having about 1 to 24 carbon atoms. Compound IV is deemed dicitrate fatty ester.

The inventors have determined that a minimum of three reverse ester alkyl chains must be present on the molecule of formula I, II and III in order to consider it a fat mimetic. Therefore, given two alkyl chains (Z) on each side of the molecule, at least one of the four x and y groups present per molecule must be other than H. This configuration guarantees a minimum of three alkyl chains distributed between the two P moieties of each molecule.

The invention also comprises methods of using the novel compositions available through formula I. One method comprises the step of replacing all or a portion of the fat content of food preparation with the novel fat mimetic. Another method comprises the novel step of using the novel fat mimetic as lubricants on food handling machinery. Still another method comprises the step of using the novel materials as a simple lubricant for machine cutting materials and the like. The utility of fat-like materials as lubricants is well known.

DESCRIPTION OF THE PREFERRED EMBODIMENTS

The invention comprises ether bridged polyesters which have been invented for the purpose of providing low calorie fat mimetic. The novel compositions have utility as: substitutes for fats in preparing food products; lubricants for food handling machinery; and lubricants for metal working machines.

An illustrative example of a novel composition according to the invention is the dicitrate fatty ester referenced above as composition IV. In this example two citric acid molecules are joined by the hydroxyl oxygen to create an ether bridged dicitrate molecule. The carboxyl groups are then esterified with fatty alcohols to provide an ether bridged polyester.

Citric acid has heretofore not been recommended for use in producing fat substitutes. The molecule has three carboxyl groups and a hydroxyl group making it an extremely functional molecule. The hydroxyl group provides problems when the carboxyls are esterified with alcohols to provide a fat substitute. It is felt the hydroxyl group provides thermal instability to citric acid based tri-esters. (See U.S. Pat. No. 4,508,746 to Hamm, column 5, lines 39-44.) Hamm suggests that the free hydroxy group be protected a suitable blocking group. Notwithstanding, it has been determined by the inventors that the hydroxyl group may be used to form an ether linkage to bind another citric acid tri-ester or HO-multibasic acids.

Citric acid is 2-hydroxy-1,2,3-propanetricarboxylic acid ($\beta$-hydroxytricarballylic acid), $C_6H_{b\ 8}O_7$ and has a molecular weight of 192.12. Citric acid is used: in the preparation of citrates; for flavoring extracts, confections, soft drinks and effervescent salts; for acidifying compounds and solutions for use as a dispersing agent; in the preparation of medicines; for use as acidulants and anti-oxidants in foods (for details see regulations of Meat Inspection Division of USDA); for use as sequestering agents; for use as water-conditioning agents and detergent builders; for use in cleaning and polishing stainless steel and other metals; for use in alkyd resins; for use as a mordant; for removal of sulfur dioxide from smelter waste gases; for abscission of citrus fruit in harvesting; and for use in cultured dairy products.

Citric acid is widely available in the market place, and may be obtained in various grades. Depending on the point of attachment of the —OH group, two isomeric structures are possible. Symmetrical attachment of the —OH group provides normal citric acid ($C_6H_8O_7$), whereas an unsymmetrical attachment of the —OH group gives isocitric acid. Accordingly, three ethers are conceptually possible from dimeric combinations of these substrate.

In one of its aspects, the invention comprises, a food material and a compound defined by the following formula:

$X-O-Y$, where each of X and Y, independently comprises

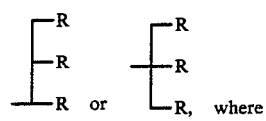 or where $$R = -\overset{O}{\underset{\|}{C}}-O-R,$$

and where $R_1$ is an alkyl group having 1 to 24 carbon atoms or alkenyl group having 2 to 24 carbon atoms.

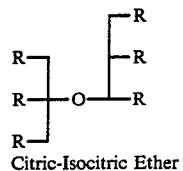
Citric-Isocitric Ether (V)

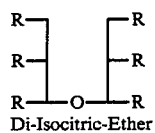
Di-Isocitric-Ether (VI)

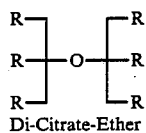
Di-Citrate-Ether (VII)

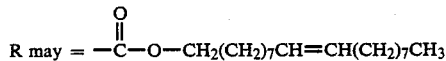
R may = $-\overset{O}{\underset{\|}{C}}-O-CH_2(CH_2)_7CH=CH(CH_2)_7CH_3$ The synthetic pathway for (V) Citric-Isocitric Ether is as follows:

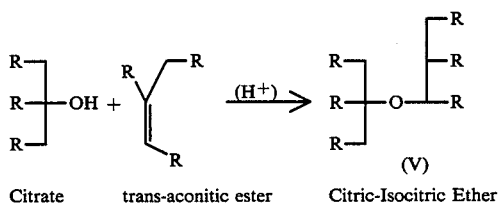

The nucleophilic properties of the —OH functionality would be exploited to bring about addition of a citrate compound to trans-aconitic acid. Steric arguments would favor attack on the least substituted end of the aconitic acid double bond to yield the citric-isocitric ether.

The synthetic pathway for (VI) di-isocitric-ether is as follows:

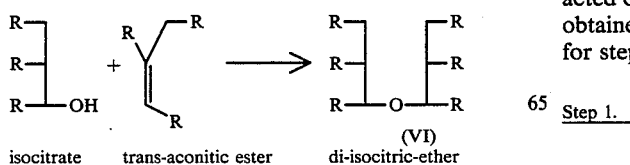

Application of an isocitrate compound in place of the citrate in the synthetic pathway for citric-isocitric ether would lead to di-isocitric-ether.

The synthetic pathway for (VII) di-citrate-ether is as follows:

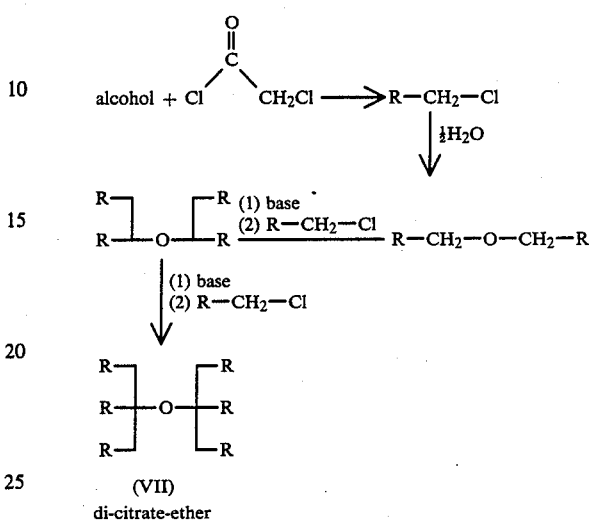

(VII)
di-citrate-ether

In the synthetic pathways

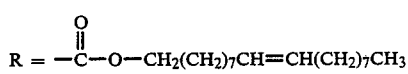

$$R = -\overset{O}{\underset{\|}{C}}-O-CH_2(CH_2)_7CH=CH(CH_2)_7CH_3$$

indicating that the alcohol is $HOCH_2(CH_2)_7CH=CH(CH_2)_7CH_3$. However, many fatty alcohols, both saturated and unsaturated can be used. Examples of suitable alcohols are n-hexadecyl alcohol, oleyl alcohol and n-octadecyl alcohol. Alcohols in the 16 to 18 carbon range are preferred as they resemble those fatty acids that are most abundant in nature and which are the most used in diets.

EXAMPLE 1

One preferred method for making the novel compound is exemplified by the three step synthesis of di (trioleyl isocitryl) ether as follows:

Step 1. Dioleyl 2,2'-oxydiacetate. Diglycolic acid (also called 2,2'-oxydiacetic acid, 134.1 g, 1.00 mole), oleyl alcohol (65% monounsaturated, 590.7 g, 2.20 mole) and trichloroacetic acid (8.17 g, 0.05 mole) may be combined in a 2000 milliliter flask containing a magnetic stirrer bar and fitted with a thermometer and vacuum distillation head and trap. The apparatus may then be evacuated to about 150 millimeters of mercury and heated by means of a variac controlled heating mantle to 140 degrees centigrade for 16 hours to complete evolution of water. After cooling to room temperature, the crude product may then be passed through a falling film still (168 degrees C., 0.8 mm Hg) to remove unreacted oleyl alcohol. Dioleyl 2,2'-oxydiacetate should be obtained in high yield as a light yellow oil. The diagram for step one is as follows:

Step 1.

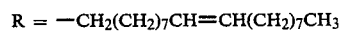

$R = -CH_2(CH_2)_7CH=CH(CH_2)_7CH_3$

-continued

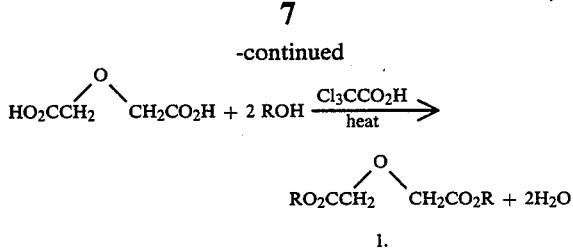

1.

Step 2. Preparation of a two to one adduct between maleic anhydride and dioleyl 2,2'-oxy-diacetate. Dioleyl 2,2'-oxydiacetate (130.7 g, 0.20 mole) obtained from step one and 500 milliliters of dry tetrahydrofuran (THF) may be combined under a nitrogen atmosphere in a 2000 milliliter, four neck flask containing a magnetic stirrer bar and fitted with two dropping funnels, reflux condenser, and thermometer. The mixture may then be cooled by means of an external bath to −78 degrees C., and a solution of lithium bis-trimethylsilylamide in THF (0.42 mole, 420 milliliters of a 1.0 molar solution) may then be added dropwise. After this addition is completed, the solution may then be maintained at −78 degrees C for 30 minutes. A solution of maleic anhydride (49.1 g, 0.50 mole) in 200 milliliters of THF may then be added drop-wise over 30 minutes with continued cooling. After this addition is complete, the reaction mixture may then be allowed to warm to room temperature over about 1.5 hours, and be allowed to stir at room temperature overnight. Water (500 milliliters) may then be added and the reaction mixture may then be extracted into diethyl ether. The ether extracts may then be washed with 5% HCL, water, and then dried over sodium sulfate. Filtration and evaporation of the solvent should provide a 2:1 adduct of maleic anhydride with dioleyl 2,2'-oxydiacetate in good yield.

The diagram for step two is as follows:

Step 2.

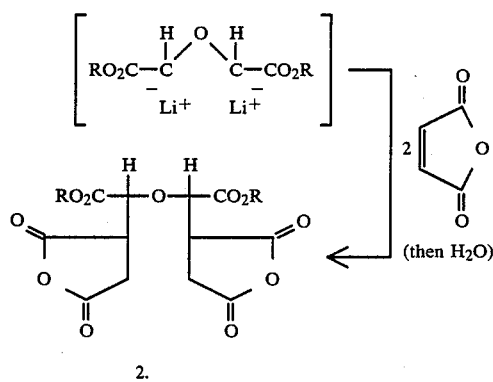

2.

Step 3. Anhydride opening and esterification reactions which yield the desired di (trioleyl isocitryl) ether. A portion of the product of step 2 (84.9 g, 0.10 mole) may be combined with 118.1 g (0.44 mole) oleyl alcohol (containing 65% monounsaturated C18 alcohol) and 2.0 g (0.012 mole) trichloracetic acid in a 500 mL flask containing a magnetic stirrer bar and fitted with a thermometer and vacuum distillation head and trap. The apparatus may then be evacuated to about 150 mm Hg, and heated by means of a variac controlled heating mantle to 140 degrees C. for 16 hours to complete anhydride opening and esterification reactions. The reaction mixture may then be allowed to cool to room temperature and the crude product may be passed through a falling film still (168 degrees C., 0.8 mm Hg) to remove excess unreacted alcohol. The product so obtained may be further purified by dissolution in hexane (3mL hexane per gram of product) and rapid passage through a column of chromatographic grade silica (2 g silica per 1.5 g of product) eluting with hexane. Evaporation of the hexane eluent provides the novel di (trioleyl isocitryl) ether as a yellow oil. The over all yield should be excellent.

The diagram for step three is as follows:

Step 3.

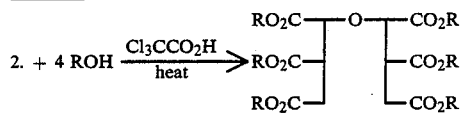

EXAMPLE 2

Step-wise Synthesis of Dioleyl 3,14-(oleyloxacarbonyl)-4,7,10,13-tetraoxahexadecane-1,16-dioate Step 1: Dioleyl maleate (also called dioleyl hydroxysuccinate).

Hydroxysuccinic acid (107.3 g, 0.8 mole), trichloracetic acid (6.7 g, 0.05 mole) and excess oleyl alcohol (1072 g, 4.0 mole) may be combined in a 2000 mL flask fitted with a thermometer, vacuum distillation head, and magnetic stirrer bar. The mixture may be placed under vacuum (about 150 mm Hg) and heated to 140 degrees C. for 20 hours to complete removal of the water by-product. The reaction mixture may then be allowed to cool to room temperature, and may then be passed through a falling film still (168 degrees C., 1.0 mm Hg) to recover unreacted oleyl alcohol. Three passes should be sufficient to provide the title ester in high purity. The product may be used in step two below.

Step 2: Dioleyl 3,14 (oleyloxacarbonyl)-4,7,10,13-tetraoxahexadecane-1,16-dioate Dioleyl hydroxysuccinate (457.1 g, 0.7 mole), 500 mL tetrahydrofuran (THF), 11 mL water (2.5%), and 1.1 g (0.01 mole) potassium t-butoxide may be combined in a 2000 mL flask fitted with reflux condenser, dropping funnel, and a magnetic stirrer bar. A solution of 160.3 g (0.35 mole) triethyleneglycol ditosylate (prepared from triethylene glycol and two equivalents of p-toluenesulfonyl chloride) in 500 mL THF may be added dropwise over 30 minutes during which time the contents of the flask are maintained at reflux temperature. Reflux should be continued for two hours. The reaction mixture should then be poured into ice water and the organic phase be separated. The aqueous phase may be neutralized with sodium carbonate and may be extracted with 500 mL of diethyl ether. The extracts may then be combined with the organic layer. This solution may be washed with 5% sodium bicarbonate solution followed with distilled water and finally dried over anhydrous sodium sulfate. The ether may be removed on a vacuum rotary evaporator, and the resulting oil may be dissolved in an equal weight of hexane. This solution may be passed through a silica column (2 g silica per gram of crude oil) which may be eluted with hexane under flash chromatographic conditions. The eluate may be evaporated and the residue may be subjected to steam deoderization (6% water by weight) at 200 degrees C. and 0.8 mm Hg. The product oil may be cooled to ambient temperature and stored under nitrogen.

The novel compounds described herein are expected to be resistant to the gut enzyme pancreatic lipase and therefore substantially indigestible. For a more detailed discussion concerning tricarboxylic acid esters see U.S. Pat. No. 4,508,746 to Hamm which is incorporated herein by reference.

Use of the novel ether bridged polyesters is expected to be similar to other fat substitutes. Thus, a portion of or all of an oil or fat requirement in food products such as margarine, mayonnaise and baked goods may be replaced with ether bridged polyesters. It should be noted that the ether bridged polyesters should be compatible with any vegetable or animal fat, shortening or otherwise. One of the more salient features of the invention is that the novel compounds disclosed herein provide ability to control non-caloric fat substitute functionality, e.g., melting point, by the prudent choice of fatty alcohols used in the various syntheses.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as their conjointly cooperative equivalents are therefore intended to be embraced by those claims.

What we claim is:

1. A composition, comprising:

$P-O-P-$, where P is equal to

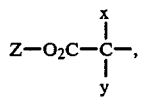

where X and Y is equal to H or $(-CH_2)_n-CO_2-Z$, wherein at least one x or y is not H, where Z is equal to or branched or un-branched alkyl chain having between about 2 and 26 carbon atoms, wherein the alkyl chain may be saturated or unsaturated, wherein n is equal to 0, 1 or 2, where Q is equal to 0 or

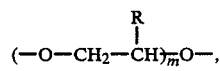

wherein m is an integer between about 1 and 20, wherein R is equal to H or an alkyl chain having between about 1 and 26 carbons, and wherein the alkyl chain may be saturated or unsaturated.

2. The composition of claim 1 wherein P comprises

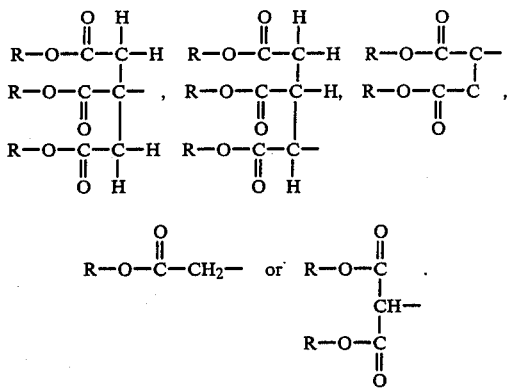

3. A non-caloric fatty compound comprising:
   (A) a first molecule comprising tribasic citric acid;
   (B) a second molecule comprising tribasic citric acid or isocitric acid connected to said first molecule by an ether linkage, wherein the ether linkage is located at either the alpha or beta carbon sites of the first and second molecules;
   (C) at least one alcohol residue connected by an ester linkage to a carboxyl group located on one of said first and second molecules, whereby citricisocitric ether, di-isocitric ether or di-citrate ether are provided.

4. The compound of claim 3 wherein the alcohol residue comprises a straight or branched carbon chain having from about 1 to about 24 carbons.

5. The compound of claim 4 wherein the alcohol residue is from saturated alcohols, unsaturated alcohols having at least 2 carbons or mixtures thereof.

6. The compound of claim 5 wherein 1 to 6 fatty alcohol residues are esterified to said first and second molecules.

7. The compound of claim 6 wherein the alcohol residues are from n-hexadecyl alcohol.

8. The compound of claim 6 wherein the alcohol residues are from n-octadecyl alcohol.

9. The compound of claim 6 wherein the alcohol residues are from oleyl alcohol.

10. The compound of claim 6, wherein the alcohol residues are from a mixture of n-hexadecyl alcohol, oleyl alcohol and n-octadecyl alcohol.

11. A non-caloric fatty compound, comprising:
    (A) first and second tricarboxylic acid molecules being connected by an ether linkage;
    (B) at least one alcohol being esterified to said tricarboxylic acid, wherein said compound has the formula:

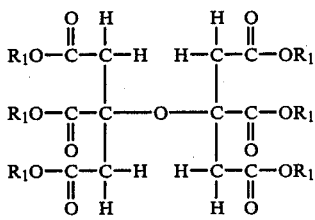

wherein at least one $R_1$ comprises a straight or branched chain alcohol residue having about 1 to 24 carbon atoms.

12. The compound of claim 11 wherein the $R_1$ groups comprise residues of saturated or unsaturated alcohols having at least 2 carbons.

13. The compound of claim 11 wherein the alcohol residue is from n-hexadecyl alcohol.

14. The compound of claim 11 wherein the alcohol residue is from n-octadecyl alcohol.

15. The compound of claim 11 wherein the alcohol residue is from oleyl alcohol.

16. A food composition having an edible oil component having reduced available calories, comprising:
   (A) dicitrate ether having six available carboxyl groups;
   (B) alcohol residues esterified to said carboxyl groups, wherein said alcohol residues comprise straight or branched chains having about 2 to about 24 carbon atoms;
   (C) an edible oil/fat.

17. The composition of claim 16 wherein the number of alcohol residues esterified to said dicitrate ether is six.

18. The composition of claim 17 wherein the edible oil comprises vegetable or animal fat.

19. The composition of claim 17 wherein the edible oil comprises shortening.

20. A method for reducing the available calories in a food composition having an edible oil component, comprising the step of: replacing at least a substantial portion of said oil in said food composition with at least one low calorie substitute comprising dicitrate ether having esterified thereto alcohol residues comprising straight or branched carbon chains having about 2 to 24 carbon atoms.

21. The method of claim 20 wherein at least one of said alcohol residues is saturated.

22. The method of claim 21 wherein at least one of said alcohol residues is unsaturated.

23. The method of claim 21 wherein the alcohol residues are from n-hexadecyl alcohol, oleyl alcohol, n-octadecyl alcohol or mixtures thereof.

24. A composition, comprising a food material and a compound defined by the following formula:

$$X{-}O{-}Y,$$

where each of X and Y, independently comprises

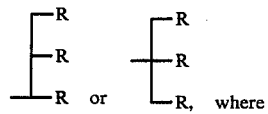

where $$R = -\overset{O}{\underset{\|}{C}}-O-R_1$$

and where $R_1$ is an alkyl group having 1 to 24 carbon atoms or alkenyl group having 2 to 24 carbon atoms.

25. The composition of claim 24 wherein $$R = -\overset{O}{\underset{\|}{C}}-O-CH_2(CH_2)_7CH{=}CH(CH_2)_7CH_3.$$

* * * * *

UNITED STATES PATENT AND TRADEMARK OFFICE
CERTIFICATE OF CORRECTION

PATENT NO. : 4,888,195
DATED : December 19, 1989
INVENTOR(S) : Stephen D. Huhn, Peter S. Given, Jr., Lawrence P. Klemann It is certified that error appears in the above—identified patent and that said Letters Patent is hereby corrected as shown below:

Column 9, line 42 should read --P—Q—P--, not "P—O—P".

Signed and Sealed this

Second Day of June, 1992

Attest:

DOUGLAS B. COMER

*Attesting Officer*    Acting Commissioner of Patents and Trademarks